(12) United States Patent
Masaki

(10) Patent No.: US 7,505,738 B2
(45) Date of Patent: Mar. 17, 2009

(54) BROADBAND RECEIVER

(75) Inventor: Tateo Masaki, Tokyo (JP)

(73) Assignee: Uniden Corporation, Tokyo (JP)

( * ) Notice: Subject to any disclaimer, the term of this patent is extended or adjusted under 35 U.S.C. 154(b) by 599 days.

(21) Appl. No.: 11/033,668

(22) Filed: Jan. 12, 2005

(65) Prior Publication Data

US 2006/0154632 A1  Jul. 13, 2006

(51) Int. Cl.
*H04B 17/00* (2006.01)
(52) U.S. Cl. .............. 455/67.11; 455/37.13; 455/158.3; 455/192.2; 455/193.3; 324/76.48; 324/76.62
(58) Field of Classification Search ............. 455/67.11, 455/67.13, 158.3, 37.13, 192.2, 192.3; 324/76.48, 324/76.62
See application file for complete search history.

(56) References Cited

U.S. PATENT DOCUMENTS

| | | | | |
|---|---|---|---|---|
| 4,791,377 | A * | 12/1988 | Grandfield et al. ........... | 327/105 |
| 5,471,402 | A * | 11/1995 | Owen ........................... | 702/76 |
| 5,710,710 | A * | 1/1998 | Owen et al. .................... | 702/75 |
| 6,363,126 | B1 * | 3/2002 | Furukawa et al. ........... | 375/344 |
| 6,459,341 | B1 * | 10/2002 | Oga ............................. | 331/37 |
| 6,879,815 | B2 * | 4/2005 | Nakamura et al. ........ | 455/192.2 |
| 6,968,162 | B2 * | 11/2005 | Nawata ....................... | 455/121 |
| 7,006,797 | B1 * | 2/2006 | Sullivan et al. ........... | 455/67.11 |
| 7,013,124 | B2 * | 3/2006 | Yasuda et al. ................ | 455/340 |
| 7,046,964 | B1 * | 5/2006 | Sullivan et al. ........... | 455/67.11 |
| 7,190,937 | B1 * | 3/2007 | Sullivan et al. ............. | 455/130 |
| 2002/0142718 | A1 * | 10/2002 | Nawata ...................... | 455/12.1 |
| 2003/0045255 | A1 * | 3/2003 | Nakamura et al. ........ | 455/192.2 |
| 2003/0190900 | A1 * | 10/2003 | Yasuda et al. ................ | 455/265 |
| 2006/0166638 | A1 * | 7/2006 | Iwaida ......................... | 455/318 |

* cited by examiner

*Primary Examiner*—Matthew D Anderson
*Assistant Examiner*—April S Guzman
(74) *Attorney, Agent, or Firm*—Vincent K Gustafson; Steven J. Hultquist; Intellectual Property/Technology Law

(57) ABSTRACT

A broadband receiver exhibiting reduced interference to a frequency counter caused by a local oscillator. The broadband receiver is arranged for detecting a radio signal of strong reception intensity and receiving the radio signal, and in a specific configuration includes: a reception system including an antenna for receiving the radio signal, a local oscillator for outputting a local oscillation signal, a frequency mixer for converting the radio signal to an intermediate frequency, and a demodulator for demodulating the intermediate frequency; a frequency counter for measuring the frequency of a radio signal having strong reception intensity; a control section for controlling the oscillation frequency of the local oscillator in such a manner that the radio signal having a strong reception intensity is demodulated by the reception system; and a local oscillator halting section for halting the oscillation of the local oscillator during the measurement of the frequency of the radio signal by the frequency counter.

1 Claim, 1 Drawing Sheet

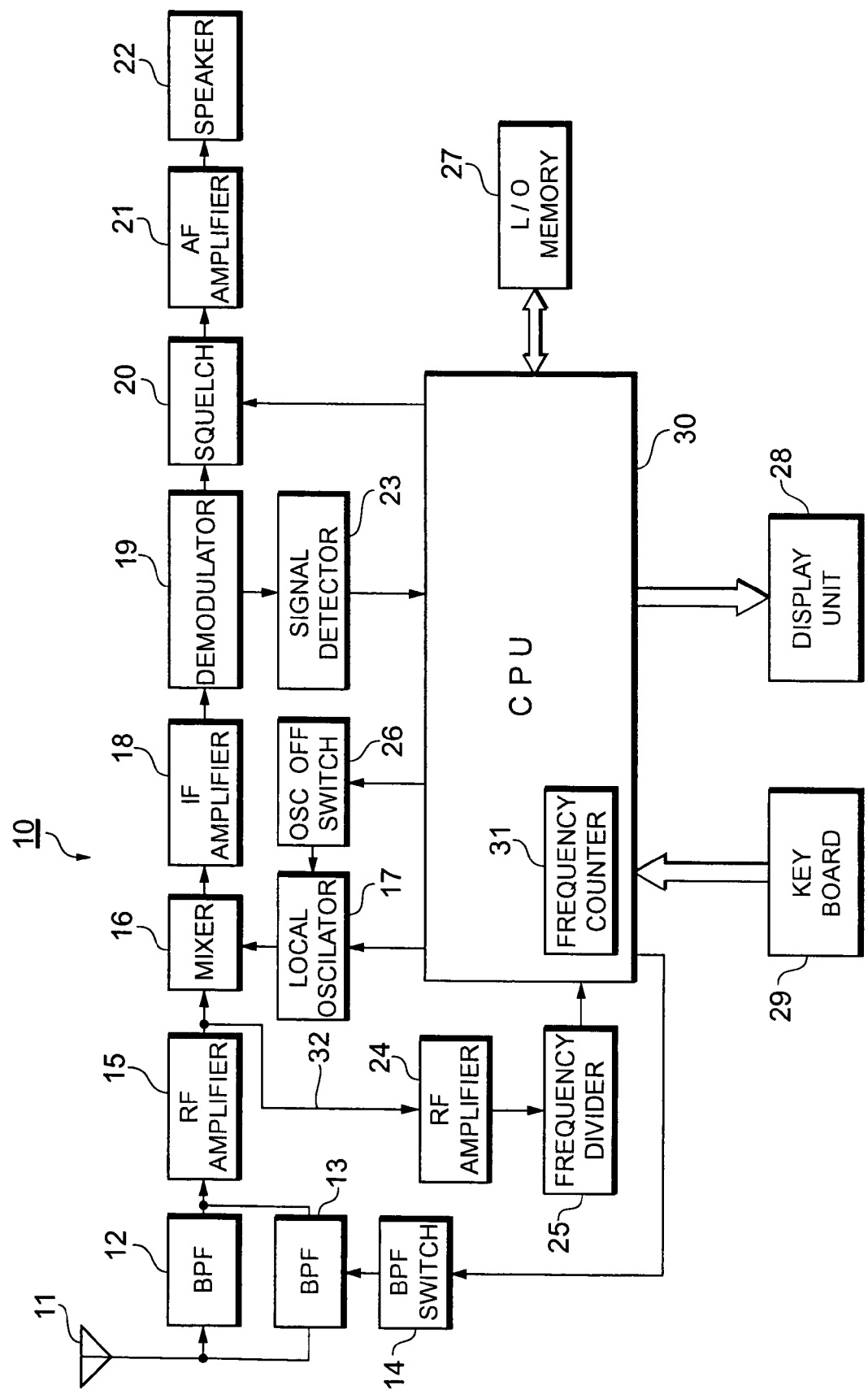

BROADBAND RECEIVER

BACKGROUND

The present invention relates to a broadband receiver, and more particularly to a broadband receiver comprising a frequency counter for measuring the frequency of reception signals.

A broadband receiver is known wherein a signal having a strong reception intensity is automatically identified from the radio waves being transmitted through a radio space, the frequency of that signal is measured by a frequency counter, and the oscillating frequency of a local oscillator is adjusted in such a manner that the reception frequency coincides with the measured frequency. A broadband receiver of this type is used, for instance, when intercepting third-party radio communications, or the like.

U.S. Pat. Nos. 5,471,402 and 5,710,710, for example, are known as patent references relating to a frequency counter.

However, in a conventional broadband receiver, there have been problems in that the local oscillation signal output by the local oscillator is taken in by the frequency counter and may cause malfunction of the frequency counter or degrade the sensitivity of the counter.

Furthermore, if a radio wave is emitted by a pager, or the like, which does not need to be received but which has a strong reception intensity, and if this wave is within the reception waveband of the frequency counter, then in a conventional broadband receiver, this unwanted wave will be always detected when a search is made for a signal having a strong reception intensity. Therefore, hence problems have arisen in that the reception frequency is made to coincide with the frequency of the unwanted radio wave.

Moreover, in a conventional broadband receiver, after detecting a signal having a strong reception intensity and receiving that signal, when the receiver searches for a new signal having a strong reception intensity, it may detect a signal that has already been detected in the past, again, and hence a problem arises in that the search for new signals becomes difficult.

Furthermore, when measuring the frequency of the reception signal by means of a frequency counter, it is possible to increase measurement accuracy by lengthening the cycle of the frequency counter, but a large amount of time is required in order to separate the noise from the signal. On the other hand, if the cycle of the frequency counter is shortened, the time required to separate the noise and the signal can be reduced, but the accuracy of the frequency measurement declines. Furthermore, if a method is adopted wherein a frequency counter having a short cycle is activated a plurality of times, the frequency being calculated by adding up the respective measurement values, then it is not possible to obtain sufficient accuracy in the frequency measurement, due to the accumulation of the measurement errors in each measurement operation.

It would be a significant advance in the art to provide a broadband receiver whereby (i) interference caused by a local oscillator with respect to a frequency counter can be reduced, (ii) previously determined unwanted radio waves are not received, (iii) prior received signals are not received again when searching for a new signal, and (iv) highly accurate frequency measurement can be achieved in a short period of time.

SUMMARY

The invention generally relates to a broadband receiver.

In one aspect, the invention relates to a broadband receiver for detecting a radio signal of strong reception intensity and receiving the radio signal, comprising: a reception system including an antenna for receiving the radio signal, a local oscillator for outputting a local oscillation signal, a frequency mixer for converting the radio signal to an intermediate frequency by means of the local oscillation signal output by the local oscillator, and a demodulator for demodulating the intermediate frequency output by the frequency mixer; a frequency counter for measuring the frequency of a radio signal having strong reception intensity; a control section for controlling the oscillation frequency of the local oscillator in such a manner that the radio signal having a strong reception intensity is demodulated by the reception system; and a local oscillator halting section for halting the oscillation of the local oscillator during the measurement of the frequency of the radio signal by the frequency counter.

By halting the oscillation of the local oscillator while the frequency counter is measuring the frequency of the radio signal, it is possible to reduce the interference caused to the frequency counter by the local oscillator.

In another aspect, the invention relates to a broadband receiver for detecting a radio signal of strong reception intensity and receiving the radio signal, comprising: a reception system including an antenna for receiving the radio signal, a local oscillator for outputting a local oscillation signal, a frequency mixer for converting the radio signal to an intermediate frequency by means of the local oscillation signal output by the local oscillator, and a demodulator for demodulating the intermediate frequency output by the frequency mixer; a frequency counter for measuring the frequency of a radio signal having strong reception intensity; a control section for controlling the oscillation frequency of the local oscillator in such a manner that the radio signal having a strong reception intensity is demodulated by the reception system; and a storage section for storing radio frequencies that are unwanted for reception; wherein the control section disregards the detection of a radio signal having a strong reception intensity, and performs detection of a new radio signal having a strong reception intensity, if the frequency of the radio signal measured by the frequency counter coincides with an unwanted radio frequency stored in the storage section or a frequency in the vicinity of same.

By means of this construction and arrangement, it is possible to avoid detection and reception of previously determined unwanted radio waves.

In a further aspect, the invention relates to a broadband receiver for detecting a radio signal of strong reception intensity and receiving the radio signal, comprising: a reception system including an antenna for receiving the radio signal, a local oscillator for outputting a local oscillation signal, a frequency mixer for converting the radio signal to an intermediate frequency by means of the local oscillation signal output by the local oscillator, and a demodulator for demodulating the intermediate frequency output by the frequency mixer; a frequency counter for measuring the frequency of a radio signal having strong reception intensity; a control section for controlling the oscillation frequency of the local oscillator in such a manner that the radio signal having a strong reception intensity is demodulated by the reception system; and a storage section for storing radio frequencies that have been received in the past; wherein the control section disregards the detection of a radio signal having a strong reception intensity, and performs detection of a new radio signal having a strong reception intensity, if the frequency of the radio signal measured by the frequency counter coincides with a previously received radio frequency stored in the storage section or a frequency in the vicinity of same.

By means of this construction and arrangement, it is possible to eliminate problems wherein a radio signal of the same frequency is detected and received repeatedly.

In yet another aspect, the invention relates to a broadband receiver for detecting a radio signal of strong reception intensity and receiving the radio signal, comprising: a reception system including an antenna for receiving the radio signal, a local oscillator for outputting a local oscillation signal, a frequency mixer for converting the radio signal to an intermediate frequency by means of the local oscillation signal output by the local oscillator, and a demodulator for demodulating the intermediate frequency output by the frequency mixer; a first frequency counter set to a long cycle for measuring the frequency of a radio signal having strong reception intensity; a second frequency counter set to a short cycle for judging whether or not the frequency of the radio signal is stable; and a control section for controlling the oscillation frequency of the local oscillator in such a manner that the radio signal having a strong reception intensity is demodulated by the reception system; wherein the first frequency counter and the second frequency counter are activated simultaneously when measuring the frequency of the radio signal, the measurement of the radio frequency by the first frequency counter is continued if it is judged by the second frequency counter that the frequency of the radio signal is stable, and the measurement of the radio frequency by the first frequency counter is interrupted if it is judged by the second frequency counter that the frequency of the radio signal is not stable.

By means of this construction and arrangement, it is possible to perform highly accurate frequency measurement in a short period of time.

DESCRIPTION OF DRAWINGS

FIG. 1 is a functional block diagram of a broadband receiver according to an illustrative embodiment of the present invention.

DETAILED DESCRIPTION OF THE INVENTION, AND PREFERRED EMBODIMENTS THEREOF

FIG. 1 is a functional block diagram of a broadband receiver 10 in accordance with the invention, according to an illustrative embodiment thereof.

The broadband receiver 10 is a receiver that automatically detects a radio signal having a strong reception intensity, and receives that signal. The broadband receiver includes a frequency counter 31 for measuring the frequency of the radio signal.

The reception system of the broadband receiver 10 includes a super-heterodyne system, comprising an antenna 11, band pass filters 12, 13, a band pass switch 14, a high-frequency amplifier 15, a frequency mixer 16, a local oscillator 17, a medium-frequency amplifier 18, a demodulator 19, a squelch circuit 20, a low-frequency amplifier 21, a speaker 22, and a signal detector circuit 23. A radio signal received by the antenna 11 is passed through the band pass filter 12 or 13 that is selected by the band pass switch 14, thereby removing unwanted components from the signal. The high-frequency radio signal having passed through the band pass filter 12 or 13 is then amplified by the high-frequency amplifier 15 and is input to the frequency mixer 16. In the frequency mixer 16, the high-frequency signal output by the high-frequency amplifier 15 and a local oscillation signal output by the local oscillator 17 are mixed, and the difference between the two signals is converted to a medium frequency and is input to the medium-frequency amplifier 18. The output from the medium-frequency amplifier 18 is demodulated by the demodulator 19 and is input to the squelch circuit 20 as a demodulated signal. The audible waveband of the demodulated signal output from the squelch circuit 20 is amplified by the low-frequency amplifier 21 and is then output as a voice signal to the speaker 22. The signal detector circuit 23 compares the signal level of the demodulated signal with the squelch level. If the signal level is less than the squelch level, then the signal detector circuit 23 outputs an output restriction signal to the CPU 30. Accordingly, the CPU 30 disconnects the demodulated signal passing through the squelch circuit 20 and thus prevents the noise components contained in the demodulated signal from being input to the low-frequency amplifier 21.

The CPU 30 is a control section for controlling the whole system. The switching of the band pass switch 14 and the oscillation of the local oscillator 17 are controlled by the CPU 30. The local oscillator off switch (local oscillator halting section) 26 is able to turn off the oscillation of the local oscillator 17, by means of an ON/OFF control signal for the local oscillator that is output by the CPU 30. The local oscillator 17 is, for example, a voltage-controlled oscillator, or the like. The CPU 30 comprises a frequency counter 31 for measuring the frequency of a radio signal. The CPU 30 is connected to a lock-out data storage device 27, a display unit 28, and a keyboard (input device) 29. The lock-out data storage device 27 stores radio frequencies that are not required for reception, such as pager frequencies, and radio frequencies that have been received in the past.

In addition to the above-described arrangement of components, a signal path 32 for inputting the signal to the control section 30 is also provided after the high-frequency amplifier 15, passing through a high-frequency amplifier 24 and a frequency divider 25. This signal path 32 is a signal path for measuring the frequency of the radio signal received by the antenna 11. The radio signal transmitted along the signal path 32 is amplified by the high-frequency amplifier 24 and then divided by the frequency divider 25. The frequency of the radio signal divided by the frequency divider 25 is measured by the frequency counter 31.

The operation of the broadband receiver 10 according to respective operating modes will now be described.

In the signal detection mode, the local oscillator off switch 26 halts the oscillation of the local oscillator 17 by means of a local oscillator ON/OFF control signal output by the CPU 30. A radio signal captured by the antenna 11 is passed through the band pass filter 12 or 13, amplified by the high-frequency amplifier 15, and then transmitted along the signal path 32, where it is further amplified by the high-frequency amplifier 24, divided by the frequency divider 25, and then input to the CPU 30. The frequency of the radio signal input to the CPU 30 is measured by the frequency counter 31. In this case, since the oscillation of the local oscillator 17 is halted, the oscillation signal output from the local oscillator 17 is not taken in by the frequency counter 31 and hence does not cause malfunction of the frequency counter 31 or reduce the sensitivity of the counter. If the CPU 30 detects a radio signal of strong reception intensity, then the fact that a signal has been successfully detected is shown on the display unit 28 and the system switches to signal reception mode.

If the radio frequency measured by the frequency counter 31 matches an unwanted radio frequency stored in the lock-out data storage device 27 or a radio frequency in the vicinity of same, then the fact that a signal has been detected successfully is disregarded and detection of a new radio signal having a strong reception intensity is carried out. A radio frequency in the vicinity of an unwanted radio frequency is, for example, a radio frequency having an error equal to an integral factor of the smallest unit (step) $\Delta f$ of reception frequency that can be detected by the broadband receiver 10. This error includes error in the reception system of the broadband receiver 10, error in the frequency counter 31, and the like. In other words, if the radio frequency measured by the frequency counter 31 is $f_0 \pm \Delta f \times N$, then the CPU 30 judges that an unwanted radio signal has been detected. Here, $f_0$ is the unwanted radio frequency and N is an integer. The value established for N depends on the reception accuracy of the broadband receiver 10, but provided that the broadband receiver 10 has relatively high accuracy, a value of N=1, or the like, is sufficient. An example of an unwanted radio frequency is, for example, the radio frequency of a pager, or the like.

In the signal reception mode, the local oscillator off switch 26 releases the halted state of the local oscillator 17, in accordance with the local oscillator ON/OFF control signal output by the CPU 30. The oscillation of the local oscillator 17 is controlled by the CPU 30 in such a manner that the target signal frequency is received. The radio signal captured by the antenna 11 is demodulated into a voice signal by the aforementioned reception system and is output as a voice sound from the speaker 22. When a reception operation for a radio signal is performed in this way, the CPU 30 stores a radio frequency that has been received in the past, in the lock-out data storage device 27. In this way, by storing a reception history, when the mode is changed again to signal detection mode, the CPU 30 judges whether or not the radio frequency measured by the frequency counter 31 matches a radio frequency received in the past, or a radio frequency in the vicinity of same, and if the radio frequency is matching, then the fact that a signal has been detected successfully is disregarded and detection of a new radio signal having a strong reception intensity can be performed. By this means, it is possible to prevent problems, such as radio signals of the same frequency being detected repeatedly and incorporated into the reception operation.

The operating mode (signal detection mode, signal reception mode) can be changed by making inputs to the keyboard 29.

In order to carry out highly accurate frequency measurement in a short period of time, combined use can be made of a first frequency counter which is set to a long cycle in order to measure the frequency of radio signals having a strong reception intensity, and a second frequency counter which is set to a short cycle in order to determine whether or not the frequency of the radio signal is stable. In order to measure the frequency of a radio signal, both frequency counters are started up simultaneously. If it is judged by the second frequency counter that the frequency of the radio signal is stable, then measurement of the radio frequency by the first frequency counter is continued, whereas if it is judged by the second frequency counter that the frequency of the radio signal is not stable, then measurement of the radio frequency by the first frequency counter is interrupted. Since the cycle of the second frequency counter is short, it is possible to determine whether or not the frequency of the radio signal is stable, in a short period of time. Moreover, since the cycle of the first frequency counter is long, highly accurate frequency measurement containing little error can be achieved. In this way, by combining two frequency counters, it is possible to perform highly accurate frequency measurement in a short period of time.

I claim:

1. A broadband receiver for detecting a radio signal of strong reception intensity and receiving said radio signal, comprising:
    (a) a reception system including an antenna for receiving said radio signal, a local oscillator for outputting a local oscillation signal, a frequency mixer for converting said radio signal to an intermediate frequency by means of the local oscillation signal output by said local oscillator, and a demodulator for demodulating the intermediate frequency output by said frequency mixer;
    (b) a first frequency counter set to a long cycle for measuring the frequency of a radio signal having strong reception intensity;
    (c) a second frequency counter set to a short cycle for judging whether or not the frequency of said radio signal is stable; and
    (d) a control section for controlling the oscillation frequency of said local oscillator in such a manner that said radio signal having a strong reception intensity is demodulated by said reception system;
    wherein said first frequency counter and said second frequency counter are activated simultaneously when measuring the frequency of said radio signal, the measurement of said radio frequency by said first frequency counter is continued if it is judged by said second frequency counter that the frequency of said radio signal is stable, and the measurement of said radio frequency by said first frequency counter is interrupted if it is judged by said second frequency counter that the frequency of said radio signal is not stable.

* * * * *